(12) United States Patent
Dunn et al.

(10) Patent No.: US 9,302,287 B2
(45) Date of Patent: Apr. 5, 2016

(54) IRRIGATION SPRINKLER WITH DEBRIS FLUSHING PERFORATED RISER

(75) Inventors: Richard M. Dunn, Carlsbad, CA (US); David W. Davidson, Del Mar (CA)

(73) Assignee: Hunter Industries, Inc., San Marcos, CA (US)

( * ) Notice: Subject to any disclaimer, the term of this patent is extended or adjusted under 35 U.S.C. 154(b) by 1181 days.

(21) Appl. No.: 12/844,650

(22) Filed: Jul. 27, 2010

(65) Prior Publication Data

US 2012/0024982 A1 Feb. 2, 2012

(51) Int. Cl.
*B05B 15/10* (2006.01)
*B05B 15/02* (2006.01)
*B05B 3/04* (2006.01)

(52) U.S. Cl.
CPC .............. *B05B 15/10* (2013.01); *B05B 15/025* (2013.01); *B05B 3/0422* (2013.01)

(58) Field of Classification Search
CPC ...... B05B 3/04; B05B 3/0409; B05B 3/0418; B05B 3/0422; B05B 15/10; B05B 15/02; B05B 15/0208; B05B 15/025
USPC .................. 239/106, 110, 112, 113, 200–206
See application file for complete search history.

(56) References Cited

U.S. PATENT DOCUMENTS

| | | | |
|---|---|---|---|
| 5,086,977 A * | 2/1992 | Kah, Jr. | 239/205 |
| 6,491,235 B1 | 12/2002 | Scott et al. | 239/206 |
| 7,287,711 B2 | 10/2007 | Crooks | 239/240 |
| 7,644,870 B2 | 1/2010 | Alexander et al. | 239/1 |

* cited by examiner

*Primary Examiner* — Christopher Kim
(74) *Attorney, Agent, or Firm* — Knobbe, Martens, Olson & Bear, LLP

(57) ABSTRACT

A sprinkler includes an outer case having an upper end and a tubular riser telescopically mounted in the outer case for extension and retraction from the upper end of the case. The riser has an upper portion with a plurality of circumferentially spaced apertures sized to allow debris to be carried through the apertures with flowing water. A riser seal is positioned and configured to substantially prevent water from escaping between the riser and the outer case when the riser is extended. A drive assembly is mounted inside the riser and includes a drive shaft that is co-axially mounted at an upper end of the riser and rotates when pressurized water is supplied to the outer case. A cylindrical nozzle housing is co-axially coupled to the drive shaft and is rotatable relative to the riser. The nozzle housing is positioned and configured to define a gap between an outer cylindrical wall of the nozzle housing and a complementary outer cylindrical wall of the tubular riser. The apertures in the upper portion of the riser intersect the gap and are configured and sized to receive pressurized water below the riser seal when the riser is retracted.

15 Claims, 4 Drawing Sheets

IRRIGATION SPRINKLER WITH DEBRIS FLUSHING PERFORATED RISER

FIELD OF THE INVENTION

The present invention relates to sprinklers used to irrigate turf and landscaping, and more particularly, to rotor-type sprinklers with pop-up risers.

BACKGROUND OF THE INVENTION

In many parts of the world there is insufficient rainfall at certain times during the year to support the health of lawns, shrubs, and other landscaping. Irrigation systems are often used in these locations that comprise an electronic irrigation controller that turns a plurality of valves ON and OFF to deliver pressurized water to sprinklers in accordance with a pre-programmed watering schedule. The sprinklers themselves are usually rotor-type sprinklers for larger areas of coverage and spray-type sprinklers or rotary stream sprinklers for smaller areas of coverage. In some cases bubblers and drip irrigation are used for trees and shrubs.

A typical rotor-type sprinkler has a generally cylindrical outer case that is mounted in a subterranean manner so that a pop-up riser with a rotating cylindrical turret or nozzle housing at its upper end is normally concealed when the pressurized water to the sprinkler has been turned OFF. The riser contains a turbine, gear train reduction and a reversing mechanism. Debris can enter the gap between the nozzle housing and the riser of a rotor-type sprinkler, leading to improper operation of the sprinkler.

FIGS. 1 and 2 illustrate the upper portion of a prior art rotor-type sprinkler 10 that includes a non-rotating tubular riser 12 that telescopes from a cylindrical outer case 14 with a female threaded inlet 15 at its lower end. Proper operation of the rotor-type sprinkler 10 can be impaired if dirt particles or other debris enters the riser 12 through a circumferential gap 16 between the riser 12 and a rotating nozzle housing 18 mounted at the upper end of the riser 12. The outer diameter of the riser 12 and the outer diameter of the nozzle housing 18 are substantially identical. The cylindrical nozzle housing 18 is co-axially located at an upper end of the tubular riser and the gap 16 is thus defined between the outer cylindrical wall of the tubular riser 12 and the nearly mating complementary outer cylindrical wall of the nozzle housing 18.

Hunter Industries, Inc., the assignee of the subject application, has in the past tried to limit operational impairment due to debris entry into the riser 12 by providing a single small circular flush hole 20 in the exterior wall of the riser 12 of its commercial rotor-type sprinklers. The flush hole 20 is positioned below the gap 16. A generally ring-shaped elastomeric riser seal 22 (FIG. 2) is mounted in the upper end of the cylindrical outer case 14 and surrounds the riser 12. The riser seal 22 is mounted and configured to substantially prevent water from escaping between the riser 12 and the outer case 14 when the riser 12 is fully extended. The flush hole 20 helps keep debris from entering a sediment basin 24 inside the riser 12 through the circumferential gap 16 and also allows debris that does enter the sediment basin 24 through the gap 16 to be expelled through the flush hole 20. A plurality of axially and radially extending support ribs 26 are located within the sediment basin 24. The support ribs 26 extend upwardly from a bottom wall 27 of the sediment basin 24. The single flush hole 20 is located just above the downwardly sloped upper edge of one of the support ribs 26. A drive assembly including a turbine 28, gear train reduction 30, and reversing mechanism 32 are mounted inside the riser 12. The drive assembly further includes a bull gear stem or tubular drive shaft 34 that is co-axially mounted at an upper end of the riser 12 and is coupled to the nozzle housing 18 via a round partition insert 36. The drive assembly rotates the drive shaft 34 and the nozzle housing 18 when pressurized water is supplied to the outer case 14 through the inlet 15.

When pressured water is applied to the rotor-type sprinkler 10 (FIG. 1), the riser 12 moves from its fully retracted position to its fully extended position. For a brief time the flush hole 20 is located below the riser seal 22 while the gap 16 is located above the riser seal 22. During this interval, pressured water that has filled the outer case 14 enters the sediment basin 24 in the riser 12 by flowing inwardly through the flush hole 20 and then leaves the sediment basin 24 through the gap 16, expelling debris in the process. The water exhausting through the gap 20 prevents any debris from entering the riser 12 through the gap 20.

Referring still to FIG. 1, the most vulnerable time for debris to enter the sediment basin 24 of the riser 12 through the gap 16 is when the gap 16 is briefly located at ground level, roughly at the same level as the top surface 14a of the external case 14. This is where dirt, sand, insects and other foreign material (debris) are usually found. When the riser 12 is fully extended, the flush hole 20 is located above the riser seal 22. In this state, water can drain out of the flush hole 20, however, small debris inside the sediment basin is often not carried with it.

Referring to FIG. 2, when the pressurized water to the sprinkler 10 is turned OFF, the riser 12 retracts under the force of a surrounding steel coil spring 38. The flush hole 20 rapidly moves below the level of the riser seal 22. Residual pressurized water inside the sprinkler 10 is forced inwardly into the riser 12 through the flush hole 20 and outwardly from the riser 12 through the gap 16. This pressurizes the sediment basin 24 while the gap 16 is near ground level to help prevent debris from entering the riser 12.

Hunter Industries, Inc. has attempted to minimize the entry of debris into the sprinkler 10 by making the gap 16 as narrow as practical and by making the flush hole 20 very small in diameter. Multiple circular flush holes have also been utilized in the riser 12 similar to the single flush hole 20 but spaced around the riser 12. Nevertheless, debris can still enter the riser 12 and sometimes does not get flushed out. After an extended period of time, foreign material may continue to accumulate inside the riser 12 and eventually impede proper operation of the sprinkler 10. Debris inside the riser 12 can lead to undesirable failure of the sprinkler by wearing out seals and bearing surfaces in the upper area of the riser. The combination of wear and accumulated debris can cause the sprinkler to leak excessively or to slow down, or stop rotating.

SUMMARY OF THE INVENTION

In accordance with the present invention a sprinkler includes an outer case having an upper end and a tubular riser telescopically mounted in the outer case for extension and retraction from the upper end of the case. The riser has an upper portion with a plurality of circumferentially spaced apertures sized to allow debris to be carried through the apertures with flowing water. A riser seal is positioned and configured to substantially prevent water from escaping between the riser and the outer case when the riser is extended. A drive assembly is mounted inside the riser and includes a drive shaft that is co-axially mounted at an upper end of the riser and rotates when pressurized water is supplied to the outer case. A cylindrical nozzle housing is co-axially coupled to the drive shaft and is rotatable relative to the riser.

The nozzle housing is positioned and configured to define a gap between an outer cylindrical wall of the nozzle housing and a complementary outer cylindrical wall of the tubular riser. The apertures in the upper portion of the riser intersect the gap and are configured and sized to receive pressurized water below the riser seal when the riser is retracted.

BRIEF DESCRIPTION OF THE DRAWINGS

Like reference numerals refer to like parts throughout the drawing figures.

DETAILED DESCRIPTION

Figure 1:
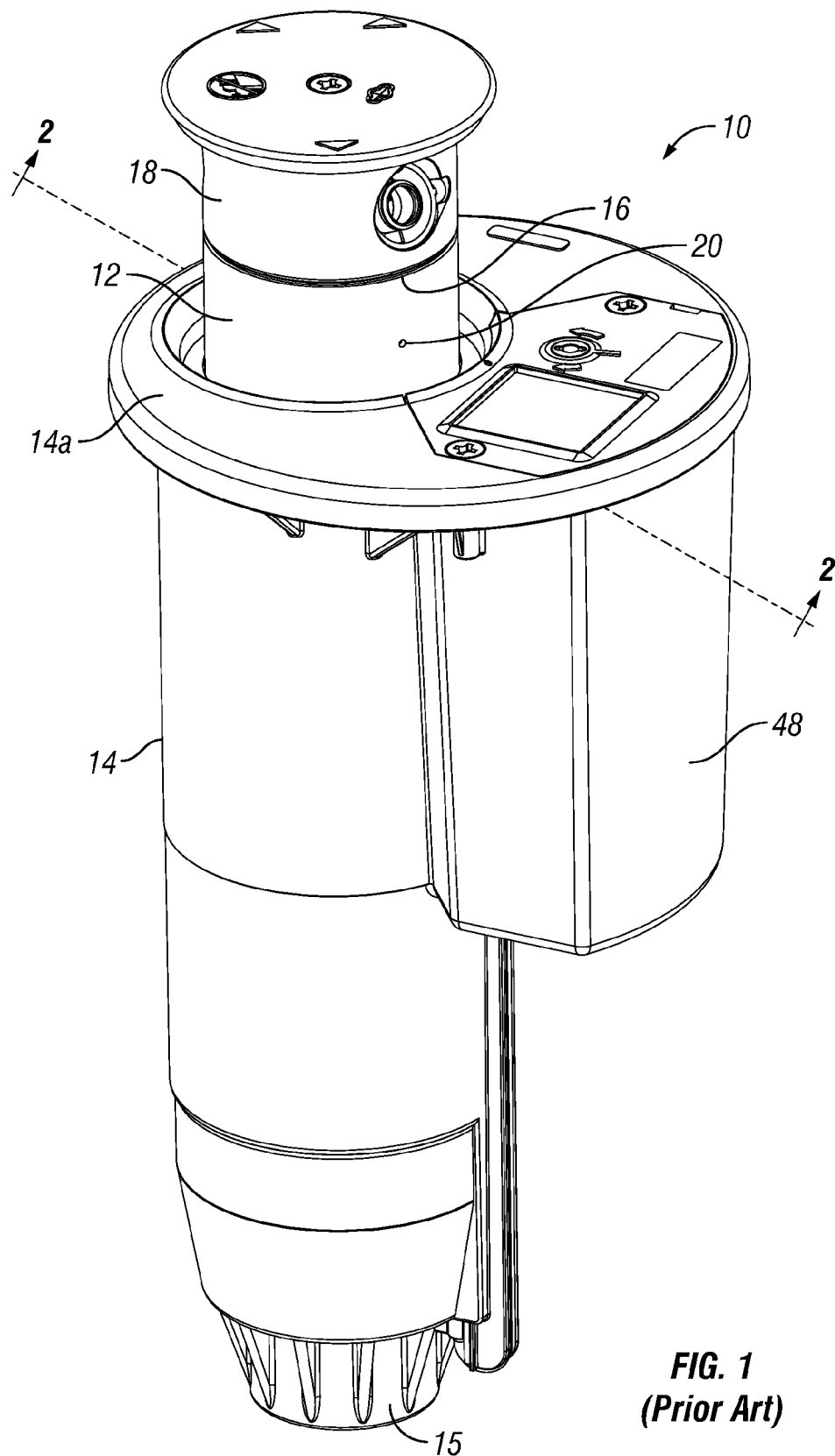
FIG. 1 is an isometric view of a prior art rotor-type sprinkler illustrating asingle flush hole in its riser. The riser of the sprinkler is fully extended in this view.
Figure 2:
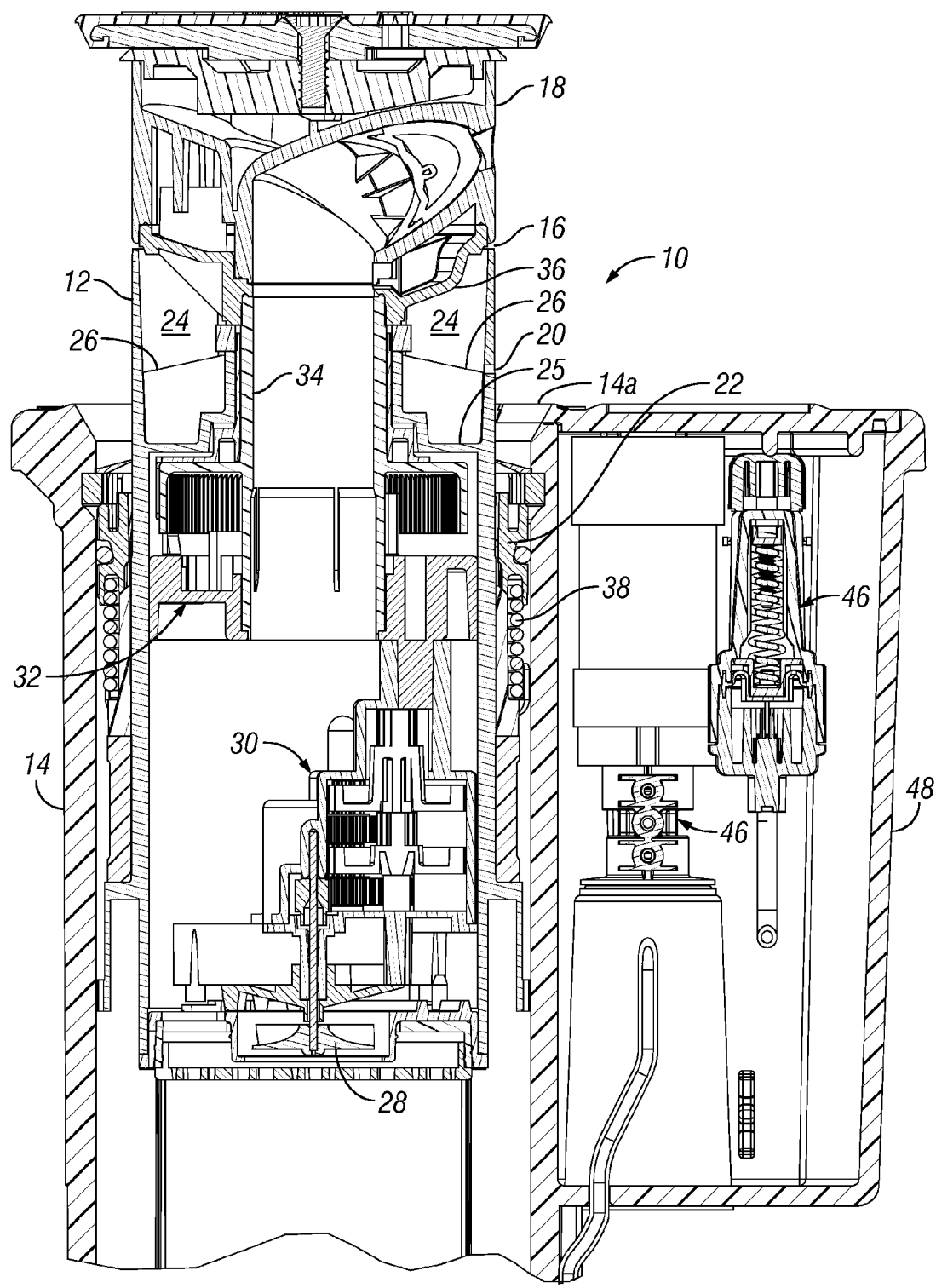
FIG. 2 is a fragmentary vertical sectional view of the sprinkler of FIG. 1 taken along line 2-2 of FIG. 1.
Figure 3:
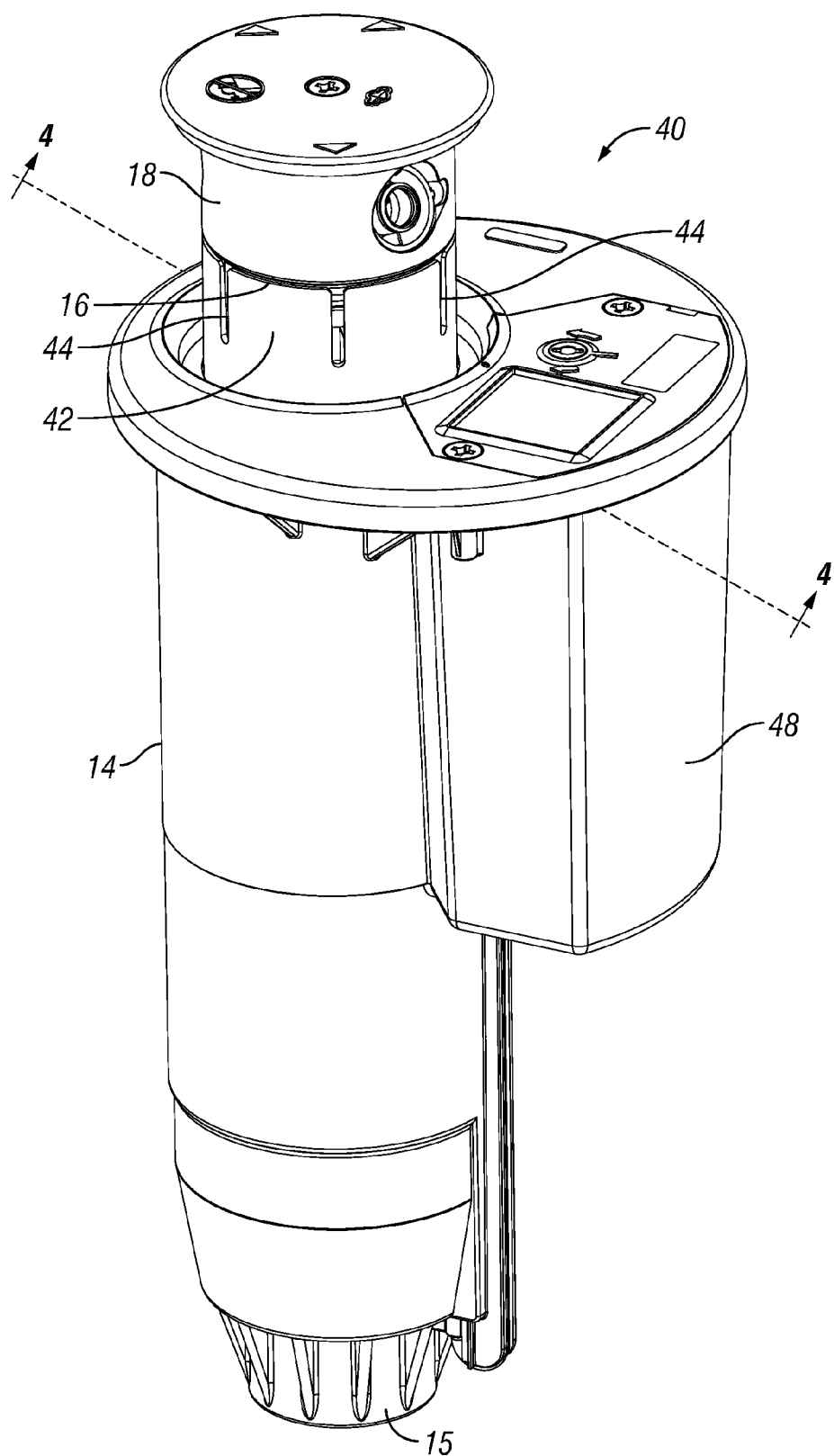
FIG. 3 is an isometric view of a rotor-type sprinkler in accordance with an embodiment of the present invention. The riser of the sprinkler is fully extended in this view.
Figure 4:
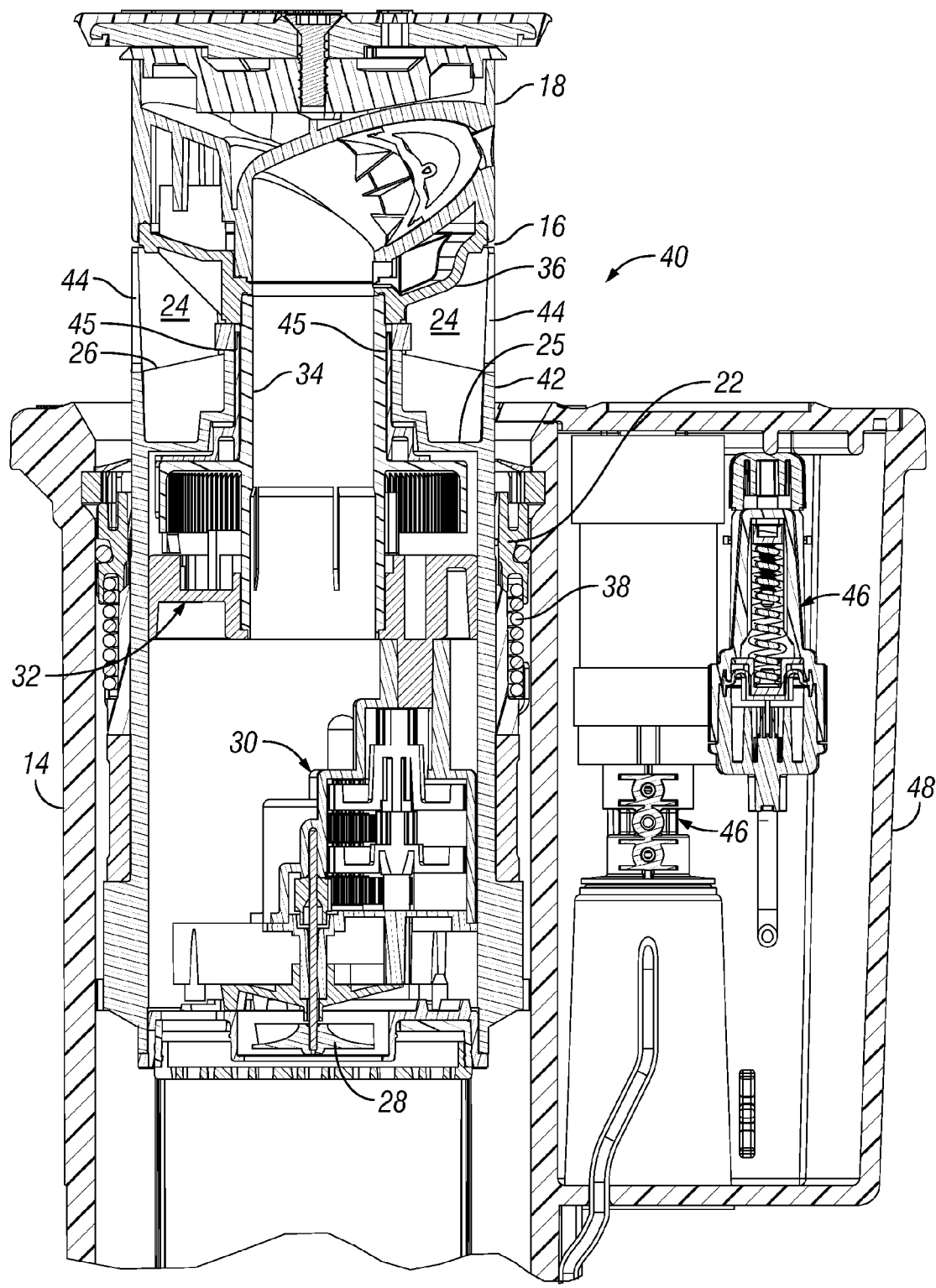
FIG. 4 is a fragmentary vertical sectional view of the sprinkler of FIG. 3 taken along line 4-4 of FIG. 3.

Referring to FIG. 3, an improved rotor-type sprinkler 40 has a construction similar to the sprinkler 10 except that it includes a riser 42 with an upper perforated portion that has a plurality of axially extending flush slots 44. The flush slots 44 are circumferentially spaced at uniform intervals about the circumference of the riser 42. In the embodiment illustrated, the sprinkler 40 has six flush slots 44 spaced at sixty degree intervals. The flush slots 44 are open at their upper ends where they intersect, i.e. join, the gap 16. The upper ends have corners with a radius. The rounded lower ends of the flush slots 44 terminate just above the support ribs 26 (FIG. 4) of the sediment basin 24. The flush slots 44 preferably have an axial length greater than one-fourth a diameter of the riser 42. The axial length of the flush slots 44 terminates below a bearing surface 45 (FIG. 4) at the top of the riser 42. The flush slots 44 also preferably have a circumferential width or span of between about four degrees and about six degrees. The flush slots 44 can be readily formed with features on tooling when the riser 42 is injection molded out of suitable thermoplastic material normally used in the fabrication of irrigation sprinklers. The flush slots are long enough to extend below the riser seal when the riser is retracted and allow water to fill the sediment basin 24 when the sprinkler is first pressurized. The design of the sprinkler 40 is innovative in that it is not intended to minimize the chances of debris entering the sediment basin 24. Instead, the configuration of the perforated riser 42 is designed to ensure that the sediment basin 24 will always be flushed of debris during the riser extension and riser retraction cycles. When the riser 42 is extending and retracting, pressurized water is still present when the flush slots 44 and the gap 16 are near ground level, thereby reduce the entry of debris into the sediment basin 24. The primary flushing, however, occurs when the riser is fully extended and the flow of water out of the slots caries the debris with it. The sediment basin 24 may have debris in the bottom between the ribs 26 without affecting the performance of the sprinkler. The bottom radius of the flush slots 44 are positioned below the functionally important bearing and seal areas of the sprinkler 40 so those areas are not impacted by unwanted debris.

The sprinkler 40 is a so-called "valve-in-head" rotor-type sprinkler with a removable valve module (not illustrated) and valve actuator components 46 (FIG. 4) contained within a generally rectangular housing 48 (FIG. 3) connected to one side of the cylindrical outer case 14. Further details of the construction of the sprinkler 40 may be found in U.S. Pat. No. 6,491,235 granted Dec. 10, 2002 to Loren W. Scott et al. entitled "Pop-Up Sprinkler with Top Serviceable Diaphragm Valve Module," the entire disclosure of which is hereby incorporated by reference. Said patent is assigned to Hunter Industries, Inc.

While I have described an embodiment of a sprinkler with a perforated riser that flushes debris, persons skilled in the art of sprinkler design will readily appreciate that my invention can be modified in arrangement and detail. For example, the number, size and placement of the apertures in the upper portion of the riser can be varied to meet the needs of a specific sprinkler. Preferably the flushing apertures should be shaped and sized to allow the debris basin to fill with pressurized water during the initial extension of the riser under water pressure. Then the expected types of debris will be carried through the apertures when the riser is fully extended as the water leaves the debris basin. Debris may also be carried through the apertures under the force of water at the lower pressures briefly present in the sprinkler once the pressurized water source to the sprinkler has been turned OFF and the riser begins to retract into the body. A variety of different aperture configurations can be utilized besides the castellated configuration illustrated in FIG. 3 that has uniformly spaced, axially extending slots. As example, the sides of each aperture need not be parallel, and could create a opening where either the top or bottom is larger than the other. The bottom of each aperture can be flat, and not have a radius. The apertures formed in the upper end of the riser need not all have the same shape. Therefore the protection afforded my invention should only be limited in accordance with the scope of the following claims.

We claim:

1. A sprinkler, comprising:
    an outer case having an upper end;
    a tubular riser telescopically mounted in the outer case for extension and retraction from the upper end of the case, the riser having an upper portion with a sediment basin and a plurality of circumferentially spaced apertures communicating with the sediment basin and sized to allow debris to be carried through the apertures with flowing water;
    a riser seal positioned and configured to substantially prevent water from escaping between the riser and the outer case when the riser is extended;
    a drive assembly mounted inside the riser including a drive shaft that is co-axially mounted at an upper end of the riser and rotates when pressurized water is supplied to the outer case;
    a cylindrical nozzle housing co-axially coupled to the drive shaft and rotatable relative to the riser, the nozzle housing being positioned and configured to define a gap between an outer cylindrical wall of the nozzle housing and a complementary outer cylindrical wall of the tubular riser; and
    the apertures in the upper portion of the riser intersecting the gap and being configured and sized to receive pressurized water there through below the riser seal when the riser is retracted, wherein the apertures comprise a plurality of axially extending slots, and wherein the slots have a circumferential width of between about four degrees and about six degrees.

2. The sprinkler of claim 1 wherein the apertures are uniformly spaced around the upper portion of the riser.

3. The sprinkler of claim 1 wherein the apertures have a uniform size and shape.

4. The sprinkler of claim 1 wherein the apertures each have a rounded lower end.

5. The sprinkler of claim 1 wherein the apertures each have an upper end with corners that have a radius.

6. The sprinkler of claim 1 wherein the apertures are located above a bottom wall of the sediment basin.

7. The sprinkler of claim 6 wherein the riser includes a plurality of axially and radially extending support ribs and the apertures are located above an upper edge of each of the support ribs.

8. The sprinkler of claim 1 wherein the apertures have an axial length that terminates below a bearing surface at the top of the riser.

9. The sprinkler of claim 1 wherein the riser has six slots.

10. The sprinkler of claim 1 wherein the lower ends of the slots terminate above a bottom wall of the sediment basin.

11. A sprinkler, comprising:
an outer case having an upper end;
a tubular riser telescopically mounted in the outer case for extension and retraction from the upper end of the case, the riser having an upper portion with a sediment basin and a plurality of circumferentially spaced apertures communicating with the sediment basin and sized to allow debris to be carried through the apertures with flowing water;
a coil spring surrounding the riser and mounted in the outer case to bias the riser to a fully retracted position;
a riser seal positioned and configured to substantially prevent water from escaping between the riser and the outer case when the riser is extended;
a drive assembly mounted inside the riser;
a cylindrical nozzle housing rotatable by the drive assembly relative to the riser, the nozzle housing being positioned and configured to define a gap between an outer cylindrical wall of the nozzle housing and a complementary outer cylindrical wall of the tubular riser; and
the apertures intersecting with the gap between the nozzle housing and the riser and sized to receive pressurized water though the apertures below the riser seal when the riser is retracted in order to fill the sediment basin with water, wherein the circumferentially spaced apertures in the riser comprise a plurality of axially extending slots, and wherein the slots have a circumferential width of between about four degrees and about six degrees.

12. A sprinkler, comprising:
an outer case having an upper end;
a tubular riser telescopically mounted in the outer case for extension and retraction from the upper end of the case, the riser having an upper portion with a sediment basin and a plurality of circumferentially spaced apertures communicating with the sediment basin and sized to allow debris to be carried through the apertures with flowing water;
a coil spring surrounding the riser and mounted in the outer case to bias the riser to a fully retracted position;
a riser seal positioned and configured to substantially prevent water from escaping between the riser and the outer case when the riser is extended;
a drive assembly mounted inside the riser;
a cylindrical nozzle housing rotatable by the drive assembly relative to the riser, the nozzle housing being positioned and configured to define a gap between an outer cylindrical wall of the nozzle housing and a complementary outer cylindrical wall of the tubular riser; and
the apertures intersecting with the gap between the nozzle housing and the riser and sized to receive pressurized water though the apertures below the riser seal when the riser is retracted in order to fill the sediment basin with water, wherein the apertures have an axial length greater than one-fourth a diameter of the riser.

13. The sprinkler of claim 12 wherein the riser and the nozzle housing have substantially the same outer diameter.

14. The sprinkler of claim 12 wherein the riser includes a plurality of axially extending support ribs.

15. The sprinkler of claim 14 wherein the apertures each have a lower end that is positioned above an upper edge of the support ribs.

* * * * *